F. M. BRINCKERHOFF.

LOCK MECHANISM FOR SLIDING DOORS.

Reissued Oct. 23, 1917

APPLICATION FILED SEPT. 15, 1917.

14,379.

Witnesses:
S. S. Grotta
W. H. Linton

Inventor:
Frank M. Brinckerhoff
by W. H. Houso
Atty.

UNITED STATES PATENT OFFICE.

FRANK M. BRINCKERHOFF, OF ENGLEWOOD, NEW JERSEY, ASSIGNOR TO JAMES L. HOWARD & COMPANY, OF HARTFORD, CONNECTICUT, A CORPORATION OF CONNECTICUT.

LOCK MECHANISM FOR SLIDING DOORS.

14,379. Specification of Reissued Letters Patent. Reissued Oct. 23, 1917.

Original No. 1,229,709, dated June 12, 1917, Serial No. 674,672, filed February 1, 1912. Application for reissue filed September 15, 1917. Serial No. 192,133.

*To all whom it may concern:*

Be it known that I, FRANK M. BRINCKERHOFF, a citizen of the United States, residing at Englewood, in the county of Bergen and State of New Jersey, have invented new and useful Improvements in Lock Mechanisms for Sliding Doors, of which the following is a specification.

This invention relates to improved mechanism for latching or locking sliding doors in an opened or partly opened position, as well as in closed position. It is herein illustrated as applied to the end doors of railway cars or coaches.

Figure 1:
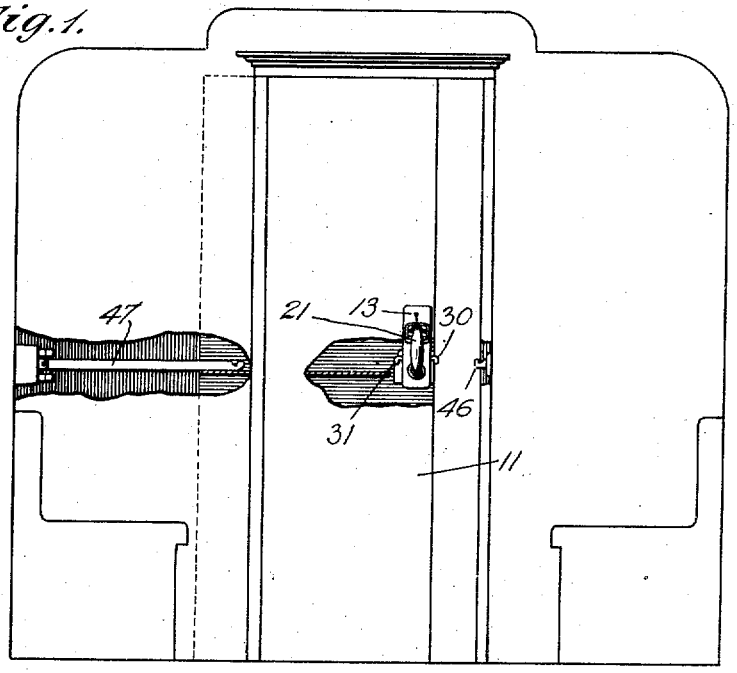
Figure 2:
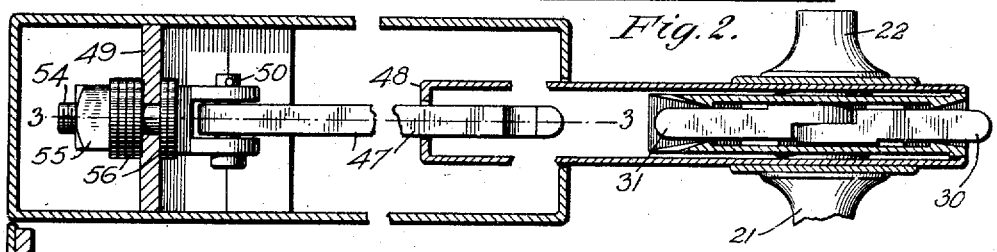
Figure 3:
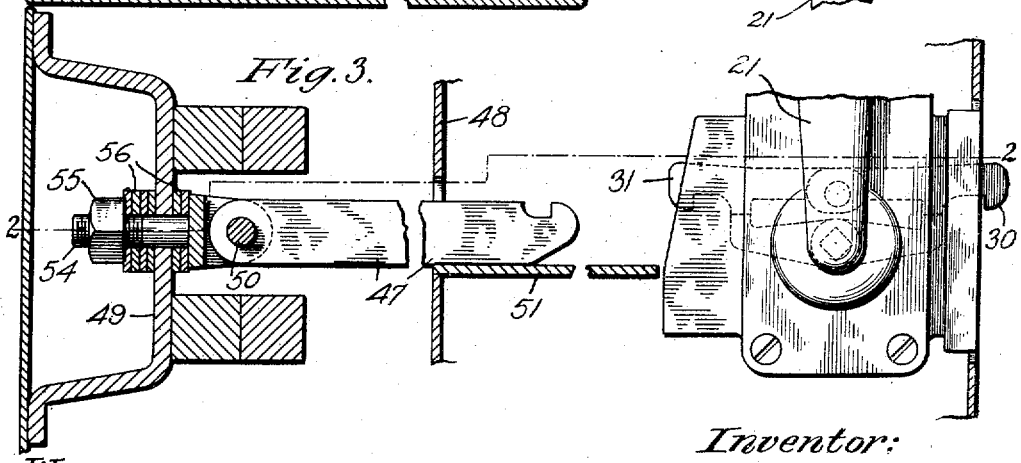

Figure 1 of the drawings is an end view of such a door in reduced scale, showing in outline the end of the car, and showing a sliding door partly opened, portions of the door and its casing being broken away to expose the mechanism of the present invention. Fig. 2 is a plan view in section taken substantially along the line 2—2 of Fig. 3. Fig. 3 is a side elevation in section taken substantially along the line 3—3 of Fig. 2.

The cars for which this invention is herein shown to be adapted are now commonly provided with sliding doors, which are mounted to slide into the bulkhead or walls of the cars, thus being out of the way and almost concealed when open. For easy operation of these doors they are commonly made to slide or roll very freely, by means of antifriction rolls, or balls, or other devices. Being thus easily moved they are liable to be slid back and forth by the movements of the cars, either when standing on inclined tracks or when swinging around curves at high speed. Hence the desirability of providing adequate means for latching such doors either in their closed, or open, or partly open, positions, according to circumstances.

The lock or latch mechanism shown upon the door in the accompanying drawings may be of any desired construction, having preferably two latches 30 and 31 for latching the door in its closed and open positions, respectively. The front latch 30 for the closed position of the door, coöperates with any suitable striker plate 46 seated in the door casing or in the rabbet thereof in coengaging relation to the latch 30. The latch 31 for the open position of the door projects in the opposite direction, toward the rearward edge of the door, and these latches may be operated in any convenient way, preferably by mechanism having operating handles 21 and 22 on opposite sides of the door. In the particular arrangement shown herein, the swinging movement of these handles in the direction in which it is desired to move the door will release from its keeper the latch which would otherwise prevent that movement. Thus, if it is desired to open the door, the handle is moved toward the left in Fig. 1, which movement of the handle serves to release the latch 30 from its keeper 46 at the edge of the door, thus allowing the door to be opened. Conversely, when the door is latched in an open position, the movement of the handle in the direction of closing movement of the door will release the left hand latch 31 from the striker plate or keeper which holds the door in its open position. This latch mechanism, however, forms no part of the present invention; and various forms of such mechanism may be employed.

In the present invention both the latch and the striker or keeper for holding the door in its opened or partly opened position are wholly concealed from view within the door and casing, being thus protected from injury and from tampering. The rearward latch 31, for holding the door in its wholly or partly open position coacts with the striker plate 47, which in the arrangement shown herein consists of a hinged bar 47 attached near its hinged end to the bulkhead 49 at the end of the runway into which the door slides, and projects through the rearward edge 48 of the door, so that when the door is in the opened position into which it is desired to latch it, the bar 47 reaches to and is engaged by the latch 31. The bar 47 is preferably hinged at 50 to allow of slight vertical swinging movement, for convenience in assembling and adjusting the door parts, so as to avoid the necessity of extreme accuracy in locating the respective parts. As a means for supporting and guiding the end of the striker bar 47, a ledge or shoulder 51 is provided on the door, at a height suitable for guiding the end of the bar into proper engaging relation to the latch 31. Thus the latch and the ledge, being both carried by the door, continue to guide the end of the bar properly in spite of any settling or other shifting that may occur between the door and the casing.

The striker bar 47 is herein shown to be hinged to the casing by means of a lug or bracket 54, which passes through the wall 49 of the bulkhead, and is secured thereto by means of a nut 55 and washers 56, which are disposed upon one side or the other of the wall 49, as may be required for the desired adjustment of the bar relative to the latch 31.

It is well known that in the railway service for which the present invention is intended, all devices, especially those including articulated mechanism, are particularly liable to abuse, and injury, either from malice, or ignorance, or both, on the part of both the employees and the public. Hence the common reference to the necessity for making such apparatus "fool proof." Many of the features of the present invention are designed with particular reference to the avoidance of such injuries or abuses. This is particularly true of the arrangement by which the operative mechanism is as far as possible contained and concealed inside of the door and casing, out of sight and out of reach of mischievous or unskilful hands, leaving only one operating handle exposed to sight and action on each side of the door; and also arranging the apparatus so that it will release the door automatically when that handle is moved in whichever direction the operator may desire to move the door.

I claim:—

1. The combination, in latch mechanism for sliding doors provided with adjacently disposed latches for different positions of the door, of keepers for said latches, one of said keepers being mounted on the door casing in the plane of the door and extending within the door through its rearward edge for engagement with its latch.

2. The combination, in latch mechanism for sliding doors, of a latch casing, a plurality of latches mounted in said casing for different positions of the door, and keepers for said latches, one of said keepers being mounted in and concealed by the door casing and extending within the door through its rearward edge for engagement with its latch.

3. The combination, in latch mechanism for sliding doors of hollow shell construction, of a latch and keeper for an open position of the door, the latch being mounted within the door shell adjacent to the front edge of the door and the keeper being mounted within the door casing and extending within the shell of the door through its rearward edge into engaging relation with the latch.

4. The combination, with a sliding door, of a latch for an open position of the door, and a keeper pivotally supported by the door casing and extending into the door through its rearward edge.

5. The combination, with a sliding door, of a latch for an open position of the door, a keeper pivotally supported by the door casing and extending into the door through its rearward edge, and a guide carried by the door for supporting and guiding the latch-engaging end of the keeper.

In testimony whereof I have signed my name to this specification in the presence of two subscribing witnesses this 30th day of January, 1912.

FRANK M. BRINCKERHOFF.

Witnesses:

ALEX. LIVINGSTON, Jr.,

NOVELL BRETROHUTTE.

Copies of this patent may be obtained for five cents each, by addressing the "Commissioner of Patents, Washington, D. C."